United States Patent Office 3,295,197
Patented Jan. 3, 1967

3,295,197
STAINLESS STEEL CLAD WITH ALUMINUM
Edward S. Bunn, Rome, Charles R. Mackey, Westernville, and Julius L. Giovannucci, Rome, N.Y., assignors to Revere Copper and Brass Incorporated, Rome, N.Y., a Maryland corporation
No Drawing. Filed May 14, 1964, Ser. No. 367,588
7 Claims. (Cl. 29—497.5)

This invention relates to stainless steel clad with aluminum, and more particularly to a method of bonding aluminum to stainless steel.

Composite metal sheets of stainless steel clad with aluminum are widely used when it is desired to take advantage of the excellent thermal conductivity of aluminum and corrosion-resistance of stainless steel, as, for example, in the manufacture of such articles as cooking utensils, reaction vessels and the like. The bond between the layer or layers of stainless steel and the layer or layers of aluminum which make up the composite metal sheet must be sufficiently strong to withstand the stresses and strains of fabrication and severe use, and therefore a metallurgical bond—that is, one formed by the diffusion of one metal into the other—should be established at the interface of the layers of metal making up the composite sheet. However, the surfaces of both stainless steel and aluminum are normally completely coated with a protective film of metal oxide, and although these oxide films are microscopically thin they prevent the metal to metal contact necessary for the formation of the desired metallurgical bond. As a consequence, in order to obtain a metallurgical bond between the stainless steel and aluminum layers of the metal composite, it has heretofore been the practice to remove by physical or chemical means the protective oxide film from the surfaces of the metal layers to be bonded together so that the so-called nascent or raw elemental metal at these surfaces can be brought directly into contact with each other without an intervening physical barrier of aluminum or other oxide therebetween. As the oxide film on aluminum almost instantaneously reforms when a fresh surface of elemental aluminum is exposed to air it is necessary to remove the oxide films and bring the exposed metal surfaces together while the aluminum and stainless steel sheets are in a protective environment such as a reducing or inert atmosphere. The desired metallurgical bond is then formed by subjecting the sheets to a combination of heat and pressure, for example, by hot rolling the sheets, in a manner well known in the art. The requirement that the surfaces of the metal sheets be oxide-free prior to and during the formation of the bond necessitates the use of complex and costly techniques and equipment, and this has been an important disadvantage of conventional processes for bonding aluminum to stainless steel.

We have now made the surprising discovery that a metallurgical bond can be formed between stainless steel and aluminum without first removing the oxide film from the surface of either metal and without using a special protective atmosphere or environment prior to and during the bonding operation. Moreover, in accordance with our discovery we have devised a unique new process for bonding aluminum to stainless steel wherein the surfaces of the metal sheets to be bonded together are not treated in any way to remove the oxide films but, on the contrary, are brought together under conditions which insure that the oxide films normally present on the surfaces of the metal sheets are not disturbed, the presence of the oxide film being a necessary factor in the ultimate establishment of a metallurgical bond in accordance with our process. Our new process for bonding aluminum to stainless steel comprises bringing a clean sheet of aluminum having the normal protective coating of aluminum oxide thereon into surface contact with a sheet of stainless steel at a temperature between about 700 to 1050° F., and then mechanically working the sheets to compress the aluminum against the stainless steel and cause the layer of aluminum adjacent the steel surface to flow plastically with respect to the steel surface whereby the layer of aluminum is adhesively bonded to the layer of stainless steel. The adhesively bonded layers of stainless steel and aluminum are then cold worked to elongate the metal at least 5% while compressing the two layers together to partially break down the mechanical or adhesive bond between the surface of the two layers of metal and slightly displace at least a portion of the oxide film, thus exposing areas of nascent metallic aluminum free of oxide film in compressive contact with the adjoining surface of the stainless steel. Finally, the cold worked layers of aluminum and stainless steel are heated to a temperature of at least 500° F. to obtain a metallurgical bond between the thus exposed areas of nascent metal at the contacting surfaces of stainless steel and metallic aluminum.

Our new process may be employed to bond a layer or sheet of aluminum to one surface or to both surfaces of a layer or sheet of stainless steel, or to bond a layer of stainless steel to one or both surfaces of a layer of aluminum. Moreover, the layers of the aluminum and stainless steel composite may be bonded together to form a relatively long or continuous sheet from which a number of other useful articles can later be fabricated, or the composite advantageously may be in the form of relatively short blanks of the approximate size and shape of the individual articles ultimately to be produced. In the latter case the bonding operation of our invention may be carried out either prior to or preferably as an integral part of the fabrication of articles which are subjected to severe cold working and annealing steps in the course of their manufacture.

The aluminum in direct contact with the layer of stainless steel should have good ductility to insure that the desired plastic flow of aluminum with respect to the stainless steel—which we refer to as the extrusion effect—will take place during the initial hot working of the composite sheet. We prefer, therefore, to use relatively pure aluminum or aluminum alloys containing not more than about 2 to 3% of alloying constituents such, for example, as 1100 and 3003 aluminum alloys. Alternatively, we may use the so-called Alclad aluminum alloys which are sheets of aluminum alloys of various compositions at least one surface of which are clad with a thin layer of relatively pure aluminum. The aluminum of course must be free of mill scale and other gross surface contaminants, but it must not be subjected to any cleaning operation that will remove or disrupt the natural metal oxide film normally present on the surface of the aluminum.

The stainless steel employed in our process is of conventional type and grade, such for example, as stainless alloys 202 and 304. It, too, should be free of mill scale and the like, and may be cleaned and degreased if desired although this is not ordinarily necessary. However, it should not be treated to remove the natural metal oxide film normally present on the surface of the steel.

The aluminum and stainless steel sheets are heated to a temperature of between about 700° and 1050° F. in an atmosphere which will not remove the oxide film normally present on the metal surfaces, the heating operation advantageously but not necessarily being carried out in an electric furnace in which is circulated the ordinary ambient atmosphere of the locality. The heated sheets are then worked mechanically to compress the aluminum against the stainless steel and cause the layer of aluminum adjacent the stainless steel surface to flow plastically with respect to the steel surface in a manner which may be regarded as analogous to the extrusion of aluminum onto the surface of the stainless steel. This so-called extrusion effect causes the sheets to become firmly bonded together by means of an adhesive or mechanical bond in which the oxide film on the metal surfaces at the interface of the layers of the metal composite plays an essential part. Thus, in a typical case the strength of the mechanical bond between the hot worked sheets is about 40 to 70 pounds per inch of width of the bonded sheets.

The mechanical working of the heated sheets is advantageously accomplished by passing the sheets through a rolling mill adapted to effect the desired plastic flow of aluminum with respect to the contacting surface of the stainless steel. The rolling operation of course reduces and elongates the sheets of aluminum and stainless steel, and to obtain the aforementioned plastic flow of aluminum the conditions of the rolling operation are controlled so that most of the elongation takes place in the aluminum layer. For example, as the stainless steel is elongated less than the aluminum, provision must be made to permit the stainless steel to travel through the rolls at a higher rate of speed than the aluminum being bonded thereto. To accomplish this different roll speeds may be employed, or the roll in contact with the outer surface of the stainless steel may have a smoother finish than the roll in contact with the outer surface of the aluminum so that a certain amount of slippage is possible between the stainless steel and the surface of the roll in contact therewith, or relative elongation of the metal sheets may be controlled by the use of appropriate lubricants. As a result, in a typical hot rolling operation in accordance with our invention in which the total reduction in thickness of the composite is between about 18 to 25%, the stainless steel is elongated between 2 to 4% and the aluminum is elongated between about 20% to 35%.

As previously mentioned, the layers of metal in the composite may be bonded together in the form of a relatively long or continuous strip in which event the sheets are first passed continuously through a furnace to heat them to bonding temperature and then are passed through a pair of rolls which effect the desired mechanical working of the heated sheets. Also, as previously mentioned, the sheets of aluminum and stainless steel which make up the composite may be in the form of individual blanks the approximate size and shape of the product ultimately to be made from the finished composite. In such case the two (or more) sheets which make up the composite are advantageously first tacked together at one edge by a spot weld or the like, and then are heated and subjected to the hot working operation which results in the desired mechanical bond between the several sheets. Moreover, as the aluminum is elongated from approximately five to fifteen times as much as the stainless steel, the aluminum sheet is advantageously shorter than the stainless steel by a corresponding amount so that after they have been compressed and elongated in the hot rolling operation the two sheets are approximately the same length.

Following the hot working operation the mechanically bonded sheets of the composite are then subjected to a cold working operation in which the sheets are elongated at least about 5%, and in some cases are elongated as much as 50% or more, in length. The cold working of the composite may be carried out in any suitable manner such, for example, as by rolling or by drawing the composite through a die-like aperture. However, we presently prefer to effect the cold-working of the composite in a deep drawing operation such as is involved in the fabrication of saucepans and other cooking utensils. In the latter case, a flat blank the approximate size and shape (i.e. round or rectangular) of the finished utensil is subjected to a conventional deep drawing operation in which the peripheral portion of the blank is cupped and drawn to form the side wall of an open top vessel. The cold working operation disrupts to a certain extent the mechanical or adhesive bond between the aluminum and stainless steel sheets of the composite, and there appears to be a very slight but significant displacement of the aluminum oxide film with respect to the stainless steel oxide film that galls the metal surfaces at the interface of the composite and thus exposes elemental or nascent metal at these surfaces. The degree of disruption or displacement of the oxide films at the interface of the metal sheets of the composite appears to be a function of the severity of the cold-working of the sheets, and this is indicated by a reduction in the strength of the mechanical bond that exists between the layers of the composite corresponding to the amount of cold working to which the sheets have been subjected. Thus, in a typical case wherein a round composite blank is deep drawn to form a conventional saucepan, the strength of the bond between the two layers of the composite at the upper edge or lip of the saucepan where the greatest degree of cold working has taken place is about 4 to 7 pounds per inch of width, the strength of the bond at the bend or turn of the saucepan between the bottom and side walls is about 15 to 20 pounds per inch of width and the strength of the bond near the center of the bottom of the saucepan where very little cold working has taken place is about 40 to 50 pounds per inch of width.

The cold worked composite having areas of nascent metal exposed at the interface of the layers of the composite is then subjected to a heat treatment to promote diffusion of the nascent metal from one contacting surface into the other metal surface and thereby form the desired metallurgical or diffusion bond between the several layers of the composite. The heat treatment advantageously comprises heating the composite, or a specific portion thereof, to a temperature of about 500° F. or above for a length of time sufficient to obtain the desired diffusion bond at the interface of the layers of the composite. As a result of the heat treatment there is a dramatic increase in the strength of the composite structure due, it appears, to the formation of the aforementioned diffusion or metallurgical bond between the layers of the composite. That this is the case is evidenced by the fact that when a composite blank is peel tested—i.e., when the layers of the composite are peeled apart—the layer of stainless steel has a uniform coating of aluminum thereon which indicates that the shearing action occurs in the aluminum metal adjacent the stainless steel layer and not between the aluminum and the stainless steel oxides as one would ordinarily expect if these oxide films had not somehow been displaced to permit a metal to metal contact between the surfaces of the metal layers in the composite.

As has been previously explained, the greater the degree of cold working to which the composite is subjected the greater will be the consequent galling of the internal metal surfaces of the composite due to relative displacement of the oxide films. Therefore, the portions of the composite which are cold-worked the most will, after the heat treatment, attain the greatest degree of diffusion bonding and will show the greatest strength of bond. For example, the strength of the bond at the upper edge or lip of a typical saucepan formed in accordance with our process is ordinarily within the range of from 80 to 180 pounds per inch of width, while the strength of the bond at the turn or bend of the saucepan after the heat treatment is ordinarily within the range of from 40 to 80 pounds per inch of width.

The following example is illustrative but not limitative of the method of our invention:

A number of aluminum and stainless steel composites were prepared by placing, in each case, a rectangular piece of 3003 aluminum alloy about 8 inches wide, 6.5 inches long and 0.091 inch thick against the undersurface of a substantially square piece of 202 stainless steel alloy about 8 inches wide, 8 inches long and 0.01 inch thick, and then fastening the two metal layers together at their forward edges by a spot weld. The aluminum and stainless steel metal layers were free of mill scale and other gross contaminants but the normal protective coating of metal oxide on the surfaces of these metal layers was not removed or otherwise disturbed. The metal composite or blanks were then heated to a temperature of between 700° and 1050° F. in an electrically fired, stainless steel lined furnace having a circulating fan located on its roof, the furnace containing the normal ambient atmosphere of the mill in which the furnace was located (about 0.4% CO and 20.2% $O_2$). The hot blanks were then rolled to a finish gauge of about 0.080 inch, the roll in contact with the stainless steel having about a 5 R.M.S. finish and the roll in contact with the aluminum sheet having about a 15 R.M.S. finish. The stainless steel was elongated about 2% and the aluminum was elongated about 30% in the hot rolling operation to produce a number of substantially square blanks about 8 inches on a side. The strength of the bond of a specimen blank was 50 pounds per inch of width of the blank. The composites were then trimmed to form a circular blank about 8 inches in diameter, and these circular blanks were subjected to a conventional deep draw to form saucepans about 6 inches in diameter. Following the deep draw operation a specimen saucepan was tested and found to have a bond strength at the upper edge or lip of the utensil of about 5 pounds per edge of width. The upper portion of the utensils were then heated to a temperature of about 600° F. for a few moments. After the heat treatment the bond strength at the upper edge of a specimen saucepan was found to be about 150 pounds per inch of width.

We claim:

1. Process for bonding aluminum to stainless steel which comprises: bringing a sheet of aluminum having the normal protective coating of aluminum oxide thereon into surface contact with a sheet of stainless steel; mechanically working the sheets while at a temperature of between about 700 to 1050° F. to compress the aluminum against the stainless steel and cause the layer of aluminum adjacent the steel surface to flow plastically with respect to the steel surface whereby the layer of aluminum is adhesively bonded to the layer of stainless steel; cold working the adhesively bonded layers of stainless steel and aluminum to elongate the metal at least 5% while compressing the two layers together to partially break down the mechanical adhesive bond between the surface of the two layers of metal and thus expose areas of nascent metallic aluminum free of oxide film in compressive contact with the adjoining surface of the stainless steel; and heating the cold worked layers of aluminum and stainless steel to a temperature of at least 500° F. to obtain a metallurgical bond between the adjoining surfaces of stainless steel and metallic aluminum.

2. Process according to claim 1 in which the stainless steel is elongated between about 1 and 5% and the aluminum is elongated between about 15 and 30% in length during the hot working of the metal sheets.

3. Process according to claim 1 in which the hot working of the metal sheets is accomplished by means of a rolling operation.

4. Process according to claim 1 in which the cold working of the metal sheets is accomplished by means of a rolling operation.

5. Process according to claim 1 in which the cold working of the metal sheets is accomplished by means of a deep drawing operation.

6. Process according to claim 5 in which the adhesively bonded stainless steel and aluminum sheets to be subjected to the deep drawing operation are in the form of a flat blank the approximate size and shape of the object produced by the deep draw.

7. Process according to claim 1 in which at least a portion of the cold worked metal sheets are heated to a temperature of within the range of between about 650 to 800° F.

References Cited by the Examiner

UNITED STATES PATENTS

| | | | |
|---|---|---|---|
| 2,860,409 | 11/1958 | Boessenkool et al. | 29—497.5 |
| 2,965,963 | 12/1960 | Batz et al. | 29—497.5 |
| 3,210,840 | 10/1965 | Ulam | 29—497.5 |

JOHN F. CAMPBELL, *Primary Examiner.*

L. J. WESTFALL, *Assistant Examiner.*